US012732530B2

(12) United States Patent
Hanley et al.

(10) Patent No.: US 12,732,530 B2
(45) Date of Patent: Sep. 8, 2026

(54) AUTONOMOUS PASSWORD SPRAYING DURING AUTONOMOUS PENTESTING

(71) Applicant: Horizon 3 AI, Inc., Dover, DE (US)

(72) Inventors: Zachary Daniel Hanley, Apex, NC (US); James Horseman, Wesley Chapel, FL (US); Anthony Pillitiere, Wesley Chapel, FL (US)

(73) Assignee: Horizon 3 AI, Inc., Dover, DE (US)

( * ) Notice: Subject to any disclaimer, the term of this patent is extended or adjusted under 35 U.S.C. 154(b) by 80 days.

(21) Appl. No.: 18/971,270

(22) Filed: Dec. 6, 2024

(65) Prior Publication Data

US 2026/0163903 A1 Jun. 11, 2026

(51) Int. Cl.
*H04L 9/40* (2022.01)
*G06F 40/284* (2020.01)

(52) U.S. Cl.
CPC ........ *H04L 63/1433* (2013.01); *G06F 40/284* (2020.01)

(58) Field of Classification Search
CPC ........................... H04L 63/1433; G06F 40/284
See application file for complete search history.

(56) References Cited

U.S. PATENT DOCUMENTS 9,888,016 B1 * 2/2018 Amin ...................... H04L 51/08
11,258,819 B1 * 2/2022 Agarwal ............. H04L 63/1425
11,329,999 B1 * 5/2022 Gibbons ............. G06F 21/6218
11,444,962 B2 * 9/2022 Crume ................ H04L 63/1416
11,973,791 B1 * 4/2024 Li ........................... G06N 5/02
12,432,197 B2 * 9/2025 Endler .................... H04L 63/20
2008/0060078 A1 * 3/2008 Lord ..................... G06F 21/552 726/26
2015/0254453 A1 * 9/2015 Sugiyama .............. G06F 21/46 713/183
2015/0381646 A1 * 12/2015 Lin .................... H04L 63/1425 726/23

(Continued)

FOREIGN PATENT DOCUMENTS

JP 3765973 B2 * 4/2006
KR 102710773 B1 * 9/2024 ............... H04L 9/40
WO WO-2024188477 A1 * 9/2024 ............. G06Q 40/08

*Primary Examiner* — John B King
(74) *Attorney, Agent, or Firm* — Flare IP PLLC

(57) ABSTRACT

An autonomous pentesting agent may execute an autonomous pentest of a network involving a password spraying operation and using a custom sequence of password candidates. The autonomous pentesting agent may execute an autonomous pentest of the network associated with multiple user accounts having access to respective network assets. The autonomous pentesting agent may obtain the custom sequence of password candidates for the user accounts based on character pattern tokens and environmental factors of the network. Each character pattern token may be associated with a set of character strings having a defined statistical probability of inclusion in a password that includes the character pattern token. The autonomous pentesting agent may perform the password spraying operation during the autonomous pentest. The password spraying operation may involve successive attempts to compromise a password of user accounts in accordance with the custom sequence of password candidates.

20 Claims, 6 Drawing Sheets

(56) References Cited

U.S. PATENT DOCUMENTS

2016/0156657 A1* 6/2016 Kaplan ............... H04L 63/1458 726/25
2021/0288981 A1* 9/2021 Numainville ....... H04L 63/1416
2022/0182397 A1* 6/2022 Romero Zambrano ..................... H04L 63/1416
2023/0015603 A1* 1/2023 Smith ................. H04L 63/1425
2023/0019448 A1* 1/2023 Deshmukh .......... H04L 63/1433
2023/0134546 A1* 5/2023 Gopalakrishnan ..... G06N 20/20 726/23
2025/0260707 A1* 8/2025 Belgi .................. H04L 63/1433

* cited by examiner

AUTONOMOUS PASSWORD SPRAYING DURING AUTONOMOUS PENTESTING

BACKGROUND

In networking, penetration testing or "pentesting" refers to conducting security operations that simulate a cybersecurity attack in order to identify vulnerabilities in a network. The goal of pentesting is to mimic the actions of a malicious actor and discover loopholes or other vulnerabilities before they can be exploited. Pentesting may include techniques such as scanning for vulnerabilities, testing system configurations and security protocols, and attempting controlled attacks to evaluate defense mechanisms within a network. Network administrators can remediate vulnerabilities uncovered during pentesting to prevent malicious actors from compromising network security using those vulnerabilities. Practicing regular pentesting can aid in maintaining high security standards, protecting sensitive data, and ensuring the continuity of network services.

SUMMARY

The described techniques relate to improved methods, systems, devices, and apparatuses that support autonomous password spraying during autonomous pentesting.

A method for autonomous password spraying by an apparatus is described. The method may include executing an autonomous pentest of a network associated with a plurality of user accounts and a plurality of network assets, wherein each user account of the plurality of user accounts has access to one or more respective network assets of the plurality of network assets, obtaining, in association with the autonomous pentest, a custom sequence of password candidates for the plurality of user accounts based at least in part on one or more character pattern tokens associated with one or more environmental factors of the network, each character pattern token associated with a set of one or more defined character strings having a defined statistical probability of inclusion in a password that includes the character pattern token, wherein the custom sequence of password candidates is ordered according to a total statistical probability of password compromise success, and performing, during the autonomous pentest, a password spraying operation associated with unauthorized access to one or more user accounts of the plurality of user accounts, wherein the password spraying operation includes one or more successive attempts to compromise the password of the one or more user accounts in accordance with the custom sequence of password candidates.

An apparatus for autonomous password spraying is described. The apparatus may include one or more memories storing processor executable code, and one or more processors coupled with the one or more memories. The one or more processors may individually or collectively be operable to execute the code to cause the apparatus to execute an autonomous pentest of a network associated with a plurality of user accounts and a plurality of network assets, wherein each user account of the plurality of user accounts has access to one or more respective network assets of the plurality of network assets, obtain, in association with the autonomous pentest, a custom sequence of password candidates for the plurality of user accounts based at least in part on one or more character pattern tokens associated with one or more environmental factors of the network, each character pattern token associated with a set of one or more defined character strings having a defined statistical probability of inclusion in a password that includes the character pattern token, wherein the custom sequence of password candidates is ordered according to a total statistical probability of password compromise success, and perform, during the autonomous pentest, a password spraying operation associated with unauthorized access to one or more user accounts of the plurality of user accounts, wherein the password spraying operation includes one or more successive attempts to compromise the password of the one or more user accounts in accordance with the custom sequence of password candidates.

Another apparatus for autonomous password spraying is described. The apparatus may include means for executing an autonomous pentest of a network associated with a plurality of user accounts and a plurality of network assets, wherein each user account of the plurality of user accounts has access to one or more respective network assets of the plurality of network assets, means for obtaining, in association with the autonomous pentest, a custom sequence of password candidates for the plurality of user accounts based at least in part on one or more character pattern tokens associated with one or more environmental factors of the network, each character pattern token associated with a set of one or more defined character strings having a defined statistical probability of inclusion in a password that includes the character pattern token, wherein the custom sequence of password candidates is ordered according to a total statistical probability of password compromise success, and means for performing, during the autonomous pentest, a password spraying operation associated with unauthorized access to one or more user accounts of the plurality of user accounts, wherein the password spraying operation includes one or more successive attempts to compromise the password of the one or more user accounts in accordance with the custom sequence of password candidates.

A non-transitory computer-readable medium storing code for autonomous password spraying is described. The code may include instructions executable by one or more processors to execute an autonomous pentest of a network associated with a plurality of user accounts and a plurality of network assets, wherein each user account of the plurality of user accounts has access to one or more respective network assets of the plurality of network assets, obtain, in association with the autonomous pentest, a custom sequence of password candidates for the plurality of user accounts based at least in part on one or more character pattern tokens associated with one or more environmental factors of the network, each character pattern token associated with a set of one or more defined character strings having a defined statistical probability of inclusion in a password that includes the character pattern token, wherein the custom sequence of password candidates is ordered according to a total statistical probability of password compromise success, and perform, during the autonomous pentest, a password spraying operation associated with unauthorized access to one or more user accounts of the plurality of user accounts, wherein the password spraying operation includes one or more successive attempts to compromise the password of the one or more user accounts in accordance with the custom sequence of password candidates.

DETAILED DESCRIPTION

Figure 1:
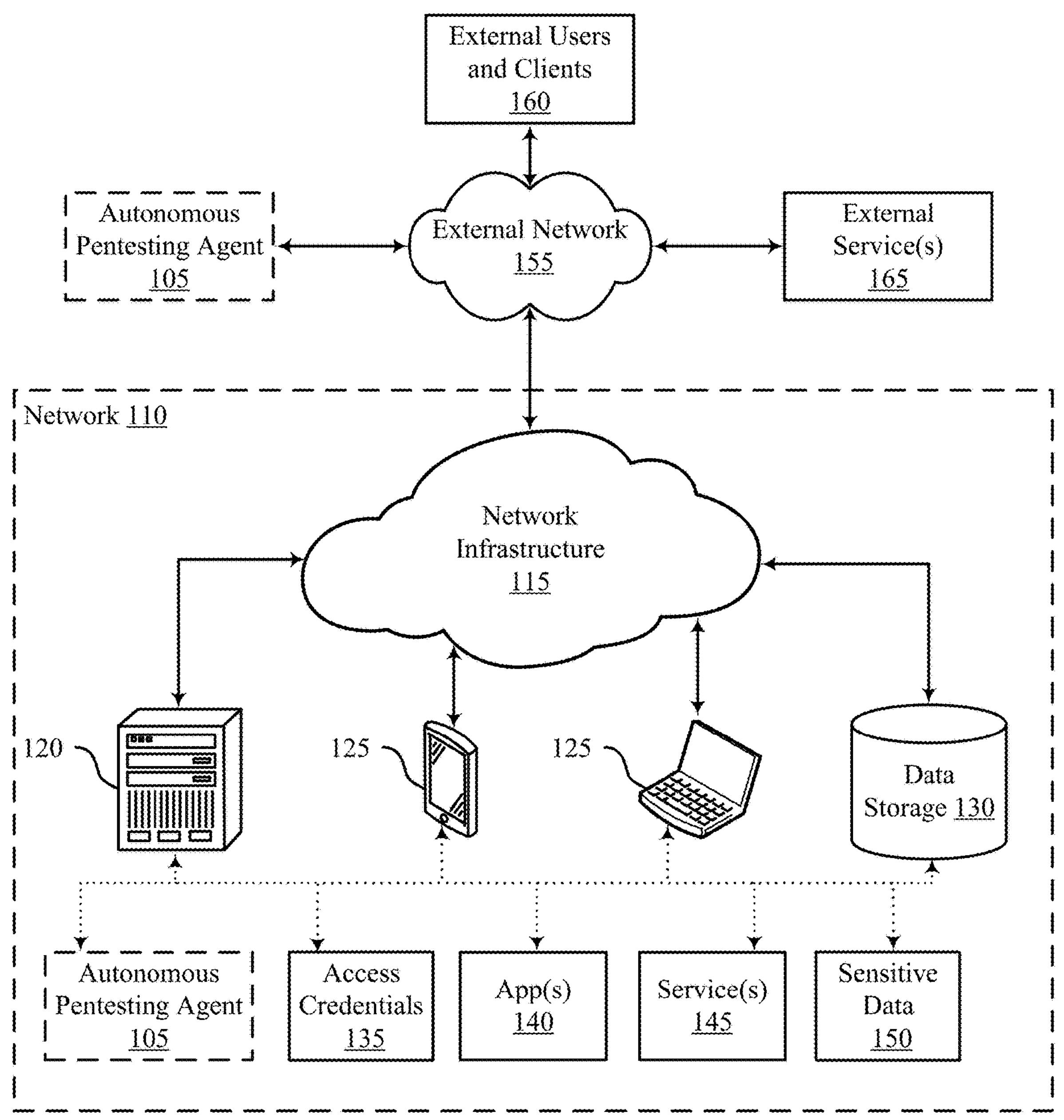
FIG. 1 shows an example of a computing environment that supports autonomous password spraying during autonomous pentesting in accordance with aspects of the present disclosure.

A pentesting agent may perform a pentest of a network including multiple network assets, where the multiple network assets are accessible via user accounts of the network. The pentest may identify weaknesses and vulnerabilities of the network by attempting to gain unauthorized access to various network assets. In some cases, the pentest may involve attempting to compromise a password credential associated with a user account to gain unauthorized access to a network asset. A password spraying attack is an example of a type of attack that involves attempting to compromise a password credential. The password spraying attack may involve attempting different combinations of usernames and possible passwords (e.g., password candidates) to access network assets. In some cases, the password candidates may be from a dictionary of common or previously compromised passwords, and the usernames may be known to the pentesting agent (such as discovered via a user directory during a pentest, provided to the pentesting agent for the pentesting, or the like). The pentesting agent may perform a brute force password spraying attack in which each combination of a password candidate and username is applied until a successful combination is achieved. However, the brute force password spraying attack may be time-consuming and computationally expensive. For example, finding a successful combination of a username and password may take the pentesting agent a long time, and an entire user directory or dictionary of common passwords may be exhausted during the pentest, which may delay results of the pentest and use a high amount of computational resources at a device of the pentesting agent. Additionally, as password complexity and length increases, the brute force password spraying attack may be inefficient, ineffective, or both.

Techniques described herein support improved efficiency for password spraying attacks in association with improving effectiveness of network pentesting. For example, a pentesting agent may perform an autonomous pentest (e.g., using artificial intelligence (AI) models, independent of hard-coding, etc.) involving a password spraying attack. The pentesting agent may determine customized password candidates for the network and use the customized password candidates for the password spraying attack during the autonomous pentest. The pentesting agent may determine the customized password candidates according to environmental factors of the network discovered during the autonomous pentest. For example, the pentesting agent may identify a geographic region or location of users, a name of an enterprise, domain names, or product names created by the enterprise. Additionally, the pentesting agent may determine the customized password candidates based on "shapes" of passwords, such as password lengths, orders of appearance of different character types, or consecutive lengths of those character types within passwords. That is, the customized password candidates may be based on statistically probable password "shapes" in combination with environmental factors. The pentesting agent may attempt to use the customized password candidates according to the statistical probability. For example, the pentesting agent may attempt to use a password candidate with a highest statistical probability first in the password spraying attack. By customizing the password candidates used in the password spraying attack and using password candidates in order of statistical probability of success, techniques described herein may reduce an amount of compromise attempts during a password spraying attack, thereby reducing an amount of time of the attack and computational resources used to perform the attack.

FIG. 1 illustrates an example of a computing environment 100 that supports autonomous password spraying during autonomous pentesting in accordance with aspects of the present disclosure. The computing environment 100 may include an autonomous pentesting agent 105 that performs an autonomous pentest of a network 110. The network 110 may include one or more devices or systems, such as a network infrastructure 115, server 120, computing devices 125, data storage 130, or any combination thereof. The devices or systems of the network 110 may be configured to access or provide various network information and services, such as access credentials 135, app(s) 140, service(s) 145, sensitive data 150, or any combination thereof.

The network 110 may allow the server 120, the computing devices 125, and the data storage 130 to communicate (e.g., exchange information) with one another. For example, the network infrastructure 115 may include any quantity of communications links and any quantity of hubs, bridges, routers, switches, ports, or other physical or logical network components that support communication between the server 120, computing devices 125, and data storage 130 of the network 110 as well as communication between the network 110 (e.g., the private network) and an external network 155 (e.g., the Internet). The network 110 may include aspects of one or more wired networks, one or more wireless networks (e.g., cellular networks), or any combination thereof. The network 110 may include aspects of one or more public networks or private networks, as well as secured or unsecured networks, or any combination thereof. For example, the network 110 may be an example of a private network that includes one or more public-facing or external assets that are accessible via an external network 155. As an example, the external network 155 may refer to the Internet, and users, such as external users and clients 160, may access the network 110 via the external network 155 through a website or application that is on the external network 155. For example, the external users and clients 160, the external service(s) 165, or both may access network information and services via the external network 155 (e.g., via the Internet), including the access credentials 135, app(s) 140, service(s) 145, and sensitive data 150.

The network 110 may be accessible via one or more hosts. For example, hosts may be examples of real or virtual machines that are connected to and capable of accessing the network 110. Real machines may refer to machines having or made up of hardware components including a central processing unit (CPU), memory, hard drive, or the like, such as physical or tangible computers or servers (e.g., the server 120, the computing devices 125, etc.). Virtual machines may refer to software within or running on a physical computer or server using portions of the CPU, memory, hard drive, or the like of the physical computer or server. A physical computer or server may include or support multiple virtual machines, such as multiple tenants (e.g., in a multi-tenant environment). The server 120 and the computing devices 125 may be examples of hosts. Hosts may communicate data with other devices within the network 110 and outside of the network (e.g., with devices in an external network 155). For example, the server 120 may send data to and receive data from one or more of the computing devices 125. Additionally, or alternatively, hosts may access resources of the network 110, including the access credentials 135, app(s) 140, service(s) 145, or sensitive data 150. As used herein, hosts may refer to web hosts, cloud hosts, virtual hosts, remote hosts, or the like.

Hosts may be examples of and include network assets. As used herein, network assets refer to machines that include network shares. For example, network assets may be examples of machines (e.g., real or virtual machines) that include shares of the network 110, such as file sharing systems. Network assets may be obtained and utilized by attackers to compromise the network 110. The server 120, the computing devices 125, the data storage 130, and the access credentials 135, app(s) 140, service(s) 145, and sensitive data 150 accessible via the devices and systems of the network 110 may all be examples of network assets. For example, physical devices (e.g., servers, computing devices, data storage, etc.) and systems may be considered network assets as well as information, apps, and services accessible through physical devices and systems of the network 110.

Hosts may store, provide, or implement access credentials 135, app(s) 140, service(s) 145, sensitive data 150, or any combination thereof. In some cases, computing devices 125 on the network may access the one or more assets (e.g., access credentials 135, app(s) 140, service(s) 145, sensitive data 150, etc.) via the server 120 (e.g., via a host). Additionally, or alternatively, computing devices 125 may locally store or otherwise access the one or more assets of the network 110. For example, users of the network 110 may access app(s) 140 and service(s) 145 via the computing devices 125 directly or indirectly (e.g., via a connection between the computing devices 125 and the server 120).

The autonomous pentesting agent 105 may perform a pentest of the network 110. As used herein, a penetration test or a "pentest" may refer to one or more security operations that simulate a cybersecurity attack in order to identify vulnerabilities in the network 110. The autonomous pentesting agent 105 may perform the pentest of the network 110 using one or more artificial intelligence (AI) models. For example, the autonomous pentesting agent 105 may be "autonomous," as the autonomous pentesting agent 105 may perform the pentest without a requirement of hard-coding, user inputs, or the like and, instead, by using the one or more AI models. The autonomous pentesting agent 105 may identify, via the pentest, security vulnerabilities of the network 110. An example of an output of the pentest may be described in greater detail elsewhere herein, including with reference to FIG. 2.

The autonomous pentesting agent 105 may, via the one or more AI models, determine and implement an attack path for a pentest. For example, the autonomous pentesting agent 105 may identify or select an asset of the network 110 to attempt to access initially and, from that asset, another asset to attempt to access, and so on. In other words, the autonomous pentesting agent 105 may use the one or more AI models to mimic decisions of an attacker. The one or more AI models may output a targeted asset of the network 110 to be subject to an access attempt by the autonomous pentesting agent 105 based on inputs including context of various assets in the network 110. In other words, the one or more AI models may output targeted assets based on the relative position of assets within the network 110, asset types, downstream assets (e.g., accessible after or through accessing a targeted asset), or the like.

The one or more AI models may be trained using data of previous pentests of the network 110 or other networks. For example, an autonomous pentesting service that deploys the autonomous pentesting agent 105 may train one or more AI models used by the autonomous pentesting agent 105 using tactics, techniques, and procedures (TTPs) of attackers (e.g., human or automated pentests), autonomous pentests performed on the network 110 previously or on other networks, or both. The autonomous pentesting agent 105 may perform improved pentests after the one or more AI models are trained using previous pentests of the network 110. That is, as the autonomous pentesting agent 105 learns more about the network 110, the autonomous pentesting agent 105 may perform pentests with higher performance levels (e.g., higher accuracy, higher quantities of potential attack paths, etc.).

In some cases, the pentest may be internal or external to the network 110. For example, the autonomous pentesting agent 105 may be deployed at a host device of the network 110 (e.g., deployed to the server 120 or computing devices 125). In such examples, the autonomous pentesting agent 105 may perform the pentest as an internal user of the network 110. Such internal pentests may be indicative of or emulate internal security threats to the network, such as from employees of an organization or an attacker that has otherwise obtained access to the network 110 internally. Alternatively, the autonomous pentesting agent 105 may be deployed at the external network 155. For example, the autonomous pentesting agent 105 may perform the pentest as an external user of the network 110, such as by accessing external or public-facing assets of the network 110 on the external network 155.

By performing the pentest autonomously via the autonomous pentesting agent 105, techniques described herein may support improved performance related to speed, identification of security vulnerabilities, and provision of remediation measures. For example, the pentest, when performed autonomously using the autonomous pentesting agent 105, may support improved performance and, by extension, improved security of the network 110 against cybersecurity attacks relative to hard-coded (e.g., automated) or manual (e.g., human operated) pentests.

As described herein, the autonomous pentesting agent 105 may perform a password spraying attack during an autonomous pentest using customized password candidates. The customized password candidates may be based on statistically probable password shapes and environmental factors of the network 110. By customizing the password candidates, techniques described herein may reduce a quantity of compromise attempts performed to successfully compromise a user compared to a brute force password spraying attack. In other words, by applying password candidates that are determined according to environmental factors of the network 110, the password spraying attack may involve more relevant and statistically probable password candidates compared to a brute force password spraying attack that uses a dictionary of common passwords, leaked passwords, or the like that are not associated with the network 110. Applying more statistically probable password candidates may decrease an amount of time, computational resources, or both associated with the password spraying attack. That is, the password spraying attack using the customized password candidates may decrease a quantity of compromise attempts (e.g., username and password candidate combinations attempted) performed by the autonomous pentesting agent 105, reducing an amount of time that the attempts are processed by computing resources of the network 110.

Additionally, techniques described herein may improve performance of the password spraying attack by biasing password candidates towards more recent passwords compared to compiled lists of breached passwords obtained over multiple years (e.g., tens of years). For example, by accounting for statistical probability of password candidates in a specific environment, the autonomous pentesting agent 105 may account for changes in trends for passwords, password policies, or the like. Further, by determining the customized password candidates according to an environment where the passwords are used, the autonomous pentesting agent 105 may generate password candidates that are more likely to be used in the environment, thereby increasing the chance of successfully compromising a user account (e.g., identifying a correct username and password combination).

Improvements to the password spraying attack involved in an autonomous pentest may support improvements to network security. For example, improved techniques related to the password spraying attack may identify weaknesses or vulnerabilities in the network 110 that a brute force password spraying attack fails to identify. Additionally, the improved techniques related to the password spraying attack may more accurately emulate an actual attack of the network 110, which may improve the accuracy of results of the autonomous pentest.

Figure 2:
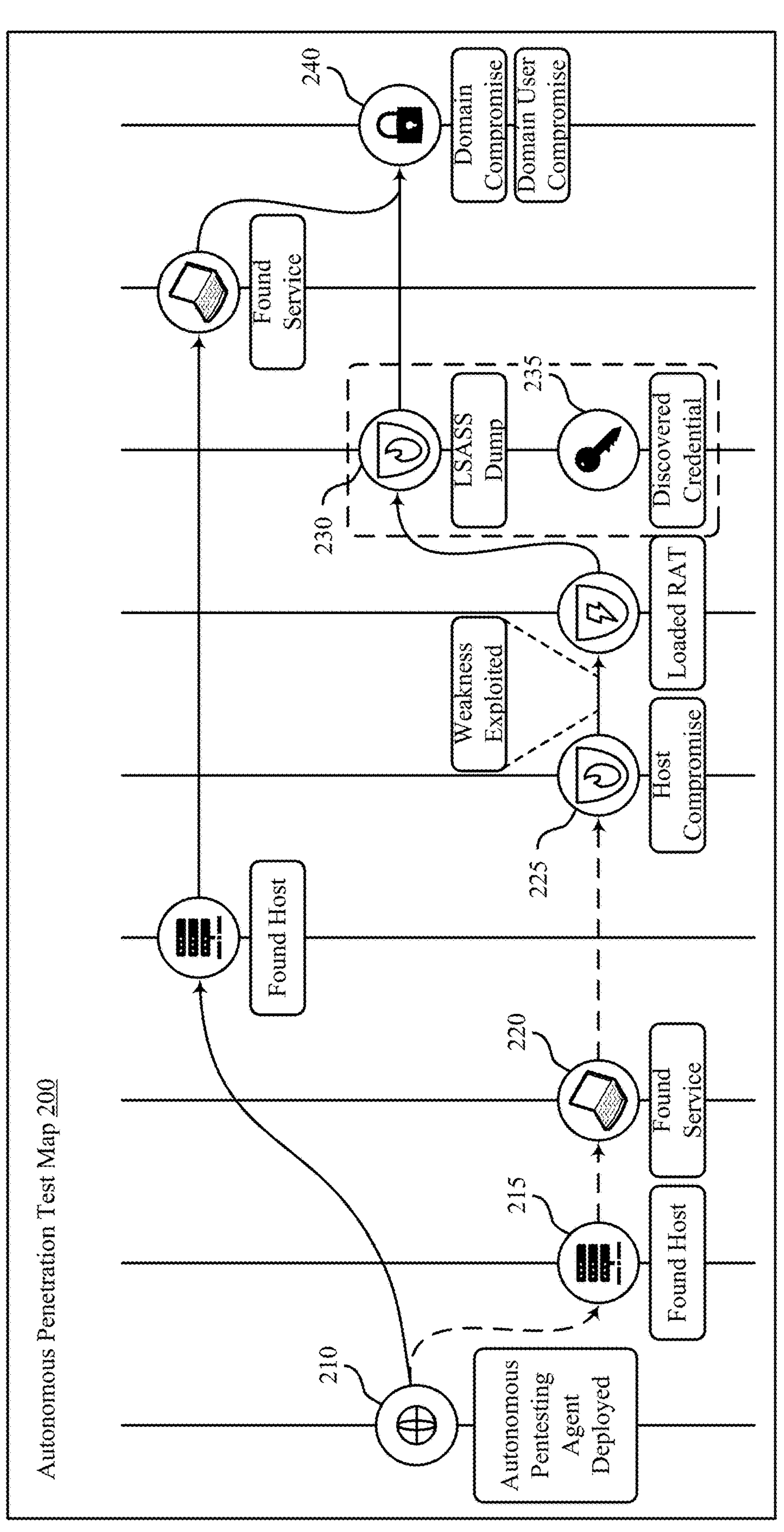
FIG. 2 shows an example of an autonomous pentest map that supports autonomous password spraying during autonomous pentesting in accordance with aspects of the present disclosure.

FIG. 2 shows an example of an autonomous pentest map 200 that supports autonomous password spraying during autonomous pentesting in accordance with aspects of the present disclosure. The autonomous pentest map 200 may be an example of an output or result of an autonomous pentest performed by an autonomous pentesting agent, such as a pentest performed by the autonomous pentesting agent 105 in the network 110 as described with reference to FIG. 1. The autonomous pentest map 200 may illustrate and describe an example of events of a pentest, including operations performed by and information obtained by the autonomous pentesting agent.

The autonomous pentest map 200 may include one or more types of events. For example, the autonomous pentest map 200 may include deployment 210 (e.g., of the autonomous pentesting agent), host identification 215, service identification 220, host compromise 225, deployment of an attacker tool 230 (e.g., a remote access tool (RAT), credential identification 235, and access 240 (e.g., to a domain, a domain user, or both). The autonomous pentest map 200 includes one possible attack path including two attack branches that is generated based on an autonomous pentest. However, it is understood that any quantity of possible attack paths having any quantity of possible attack branches may be output from an autonomous pentest. In other words, the autonomous pentest map 200 may include one or more attack paths having one or more respective attack branches. In some cases, dozens, hundreds, or thousands of possible attack paths, branches, or both may be generated based on the autonomous pentest. Additionally, it is understood that while the autonomous pentest map 200 shown in FIG. 2 displays one example of an autonomous pentest for illustration, other maps including various different events, hosts, attack paths, and attack branches may result from various autonomous pentests.

In the example of the autonomous pentest map 200, the autonomous pentesting agent may identify an attack path having two attack branches. As used herein, attack "path" may be understood to refer to a series of events, set in motion by the autonomous pentest agent, that lead to a compromise of one or more components or assets of a network. Additionally, "branches" or "chains" of an attack path may refer to one or more events occurring simultaneously or in parallel that lead to the compromise. As an example, in a first attack branch of the autonomous pentest map 200, the autonomous pentesting agent may identify a host, identify a service, and compromise the host (e.g., through the service). On the compromised host, the autonomous pentesting agent may exploit a weakness identified on the service running on the host to load a RAT and remotely control the compromised host. The autonomous pentesting agent pay perform, via the RAT, a Local Security Authority Subsystem Service (LSASS) dump, allowing the autonomous pentesting agent to discover a credential. The autonomous pentesting agent may use the credential in a different branch of the attack path. For example, in a second attack branch of the autonomous pentest map 200, the autonomous pentesting agent may identify a host and, through the identified host, a service. The autonomous pentesting agent may use the discovered credentials (e.g., of the first attack branch) at the service (e.g., of the second attack branch to obtain access 240 to the domain, domain user, or both.

An autonomous pentesting service may display the autonomous pentest map 200 such that compromised assets may be identified and security measures may be put in place. In some cases, the autonomous pentesting service may provide mitigation recommendations according to the autonomous pentest map 200. As an example, the autonomous pentest map 200 may identify a particular host or service as a security vulnerability for a network by tracing the access 240 backwards to a host identification 215 event. Accordingly, the autonomous pentesting service may provide a mitigation recommendation to be applied to the host involved in the host identification 215 event, such as according to how the host was identified or how access was obtained to the host at the host compromise 225 event. Similarly, the autonomous pentesting service may provide a mitigation recommendation to be applied to the service involved in the service identification 220 event.

The autonomous pentesting service may support autonomous password spraying during autonomous pentests. For example, the autonomous pentesting service may display, via a user interface, fields in which a user may input information for password spraying, including a user directory, environmental information, expired passwords, or the like. An autonomous pentesting agent may use the information input by the user during the autonomous pentest to determine password candidates that are most statistically probable to be successful in a password spraying operation. The autonomous pentesting agent may conduct the password spraying operation by starting with the most statically probably password candidates in combination with known usernames to attempt unauthorized access one or more applications, services, or other network assets. In the example of the autonomous pentest map 200, the autonomous pentesting agent may identify a credential (e.g., corresponding to credential identification 235) via the password spraying attack using the statistically probable password candidates.

Figure 3:
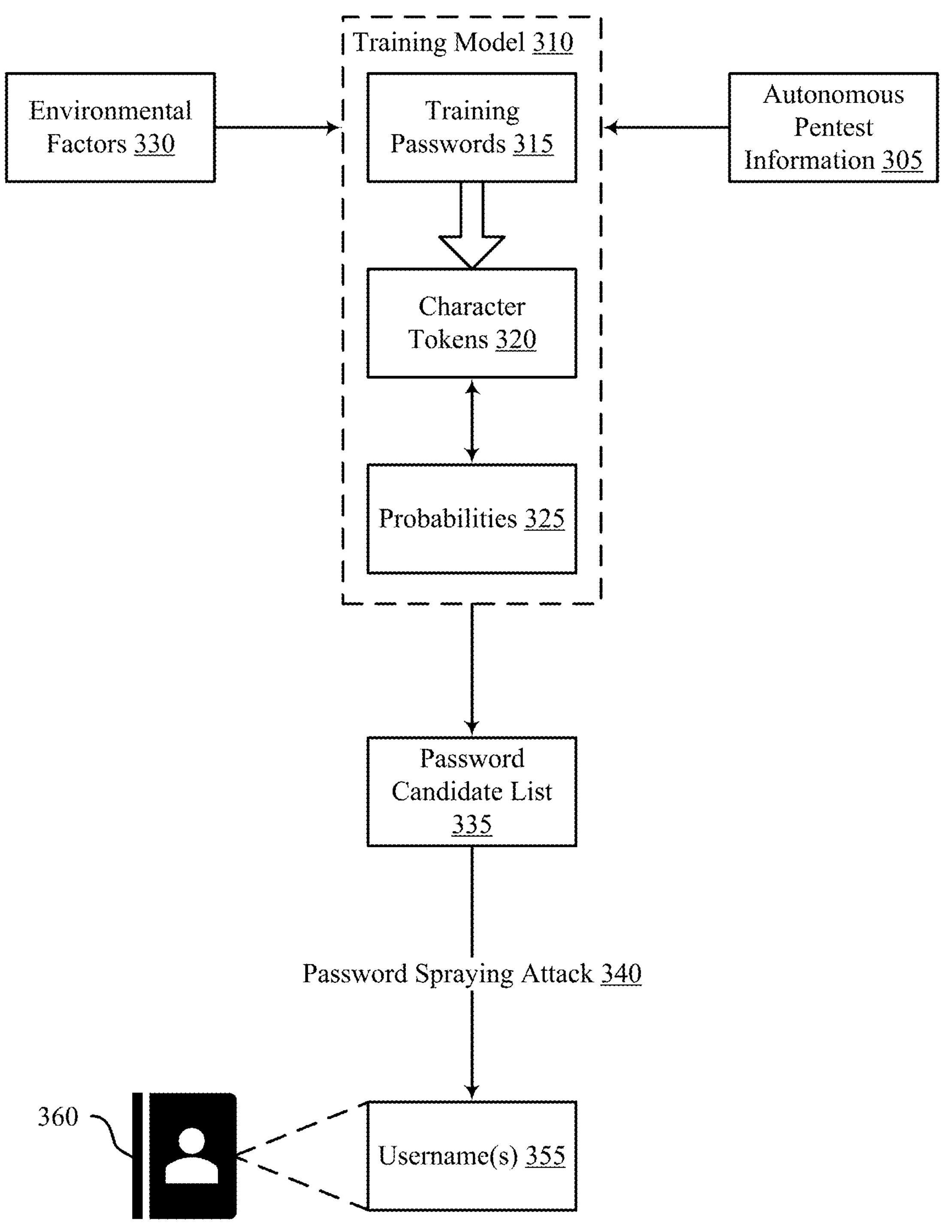
FIG. 3 shows an example of a password spraying attack flow that supports autonomous password spraying during autonomous pentesting in accordance with aspects of the present disclosure.

FIG. 3 shows an example of a password spraying attack flow 300 that supports autonomous password spraying during autonomous pentesting in accordance with aspects of the present disclosure. The password spraying attack flow 300 may implement or be implemented by the computing environment 100, the autonomous pentest map 200, or any combination thereof. For example, the password spraying attack flow 300 may illustrate elements and operations involved in a password spraying attack of a network including multiple network assets, such as the network 110 and the network assets described with reference to FIG. 1. Additionally, the password spraying attack flow 300 may be performed by an autonomous pentesting agent, such as the autonomous pentesting agent 105 described with reference to FIG. 1.

An autonomous pentesting agent may execute an autonomous pentest of a network associated with multiple user accounts having access to different network assets of multiple network assets of the network. For example, the network may include multiple assets that are accessible to different user accounts, such as accessible by using credentials (e.g., a username and password of a user account). In some cases, during the autonomous pentest, the autonomous pentesting agent may perform a password spraying attack 340 (e.g., a password spraying operation). Password spraying may involve exposing security vulnerabilities in the network by attempting to compromise a password credential associated with a user account to gain unauthorized access to a network asset (e.g., a protected network asset). As an example, the autonomous pentesting agent may perform the password spraying attack 340 in an attempt to compromise a user included in a user directory 360 (e.g., a Microsoft Active Directory or other directory) of the network, which may allow the autonomous pentesting agent to access network assets that are accessible via the user account, including protected information or administrative access to a machine, domain, or service.

The password spraying attack 340 may involve taking username(s) 355 (e.g., a list of known usernames) and trying different combinations of username(s) 355 and possible passwords (e.g., password candidates) to access network assets. The autonomous pentesting agent may obtain the username(s) 355 in connection with pentesting (e.g., during a current autonomous pentest, one or more previous autonomous pentests, etc.), via user inputs (e.g., directly from a user of the network, such as from an administrator), or the like. For example, the autonomous pentesting agent may identify the user directory 360 during an autonomous pentest and use the username(s) 355 of the user directory 360 during the password spraying attack 340. Additionally, or alternatively, the autonomous pentesting agent may receive one or more inputs (e.g., from a network administrator in connection who requests the pentest, from a previous pentest of the same network or a related network, etc.) indicating the username(s) 355, such as directly indicating the username(s) 355, by indicating the user directory 360, or the like.

In some cases, password spraying may involve a brute force attack using a dictionary of common or previously compromised passwords in combination with the username(s) 355. In other words, password spraying may be performed in a brute force manner using password candidates that are not statistically probable or based on an environment in which they are being applied. Brute force password spraying may be time consuming and computationally expensive, as a large quantity of username and password candidate combinations may be applied before a match is identified, especially in cases where security policies of a network require passwords of a relatively high complexity level (e.g., require a high quantity of characters, special characters, numbers, etc.).

To improve efficiency of password spraying, techniques described herein may support using statistically probable, customized password candidates in a password spraying attack. The autonomous pentesting agent may perform or leverage statistical analysis on shapes and characteristics of passwords and select probable password variations to use in the password spraying attack 340. For example, the autonomous pentesting agent may identify patterns and commonalities in how passwords are put together (e.g., rather than simply whether a password is commonly used). Additionally, the autonomous pentesting agent may identify probable content to include in a password of a statistically probable shape (e.g., pattern of characters) based on environmental factors of a network where the password is to be applied. Based on analyzing password shapes and environmental factors, the autonomous pentesting agent may determine a list of password candidates to use in the password spraying attack 340. For example, the autonomous pentesting agent may generate customized password candidates that fill in statistically probable shapes with words or characters that are associated with an environment of the network (e.g., related to the company, a geographic area, etc.). The autonomous pentesting agent may apply the list of password candidates in an order from a highest probability of success to a lowest probability of success. By determining the password candidates based on probable password shapes and in accordance with environmental factors of the network, the autonomous pentesting agent may shorten an amount of time, reduce computing resources, or both of the password spraying attack 340.

As used herein, a password "shape" may refer to a pattern of a password. For example, a password shape or pattern may refer to an order of character types used, how long strings of character types are, how long a total password is, or the like. As an example, a password shape or pattern of a password "training24PASSWORD$" may refer to 8 lowercase characters, 2 numerical characters, 8 uppercase characters, and 1 special character. Analysis of password shapes and the use thereof may be described in greater detail with reference to FIG. 4.

In some examples, the autonomous pentesting agent may identify password shapes or patterns via a training model 310. The training model 310 may involve or use training passwords 315 (e.g., known passwords). The autonomous pentesting agent may obtain the training passwords 315 from prior pentesting operations, publicly available information, directly via user input, or a combination thereof.

For example, the autonomous pentesting agent may obtain one or more of the training passwords 315 from prior pentesting operations (e.g., autonomous pentests), including of the network and of similar networks. That is, the autonomous pentesting agent may perform one or more pentests of the network prior to an autonomous pentest performed in the example of FIG. 3, where the one or more pentests involve obtaining one or more passwords. Additionally, or alternatively, the autonomous pentesting agent may obtain one or more of the training passwords 315 from one or more pentests of a network that is similar to the network subject to an autonomous pentest in the example of FIG. 3. That is, the training passwords 315 may include passwords obtained via one or more autonomous pentests of a different network that has one or more characteristics within a threshold level of similarity to the network. In such examples, the passwords obtained from the different network may be anonymized. Autonomous pentest information 305 input to the training model 310 may include the one or more passwords obtained via previous pentests of the same network or different network(s).

In some examples, the autonomous pentesting agent may obtain one or more of the training passwords 315 from publicly available sources. For example, the autonomous pentesting agent may obtain known, compromised passwords that are available via the Internet (e.g., via the Dark Web), available via providers of security information, or otherwise included in dictionaries or lists of common passwords. That is, the autonomous pentesting agent may obtain one or more of the training passwords 315 from sources external to the network, unassociated with pentesting operations, or both.

Additionally, or alternatively, the autonomous pentesting agent may obtain one or more of the training passwords 315 from direct inputs. For example, the autonomous pentesting agent may obtain inputs indicating passwords to use as training passwords 315 during the password spraying attack 340 (e.g., or the autonomous pentest, generally). The indicated passwords may include expired passwords of user accounts of the network or used in connection with the network. In some examples, an administrator of the network, another user of the network, or a security provider may provide the expired passwords directly to the autonomous pentesting agent, such as via a user interface of an autonomous pentesting service (e.g., as described with reference to FIG. 2).

The training model 310 may involve parsing the training passwords 315 into character tokens 320. For example, the autonomous pentesting agent may parse the training passwords 315 into character tokens 320 based on the length of the training passwords 315 and the environment in which they appear. The parsing may include breaking each training password into different character strings (e.g., lowercase, uppercase, numerical, or special character strings) and tagging one or more of the character strings. Examples of tags may include a keyboard walk, weak term passwords (e.g., including leet speak), common root words (e.g., a month, season, "welcome," etc.), environmental words (e.g., a company name or product), or the like. As used herein, a "character token" may refer to a fixed quantity of characters including one or more character string types, such as lowercase, uppercase, numerical, or special characters. Additionally, a "character string" may include a quantity and type of characters (e.g., a single character type per character string).

In some examples, the training model 310 may be based on environmental factors 330. For example, the environmental factors 330 may be used for the parsing of the training passwords 315 into character tokens 320, the tagging, or both. Use of the environmental factors 330 may refer to geographically or environmentally-driven awareness, use of open source intelligence, or both. For example, the environmental factors 330 may include geographic or environmental-specific factors, such as terms with relevance to a particular geographic area, including sports teams, landmarks, or the like. In examples in which the training model 310 is used during an autonomous pentest, the training model 310 may adapt in real-time to environmental information uncovered during the autonomous pentest. For example, the autonomous pentesting agent may identify, during the autonomous pentest, an internet protocol (IP) address that is associated with a location of one or more devices or users of the network being tested. The autonomous pentesting agent may determine a geographic region associated with the IP address and prioritize the geographic region to dynamically obtain the common character positions and patterns specific to the pentesting environment. In other words, the autonomous pentesting agent may prioritize character tokens 320 that may have increased probabilities based on the environmental factors 330 when determining the probabilities 325 and the password candidate list 335. As an example, the autonomous pentesting agent may prioritize character tokens 320 having sequences of characters or patterns that align with environmental information, such as a quantity of uppercase or lowercase characters matching a quantity of letters in a name of a regional sports team.

The autonomous pentesting agent may obtain, in addition to or alternatively from obtaining information during autonomous pentests, environmental factors 330 from open source intelligence. That is, the autonomous pentesting agent may obtain information about people of an organization that is associated with the network, including names and information about family members, topics that people of the organization have a connection to, or the like. The autonomous pentesting agent may obtain the information via the Internet, including via the Dark Web, compromised organizational messaging data (e.g., Microsoft Teams data, Slack data, etc.), social media, and search engine results specific to a geography of the organization or people of the organization.

In some examples, the environmental factors 330 may be tokenized and input into the training model 310. For example, the environmental factors 330 may include various environmental information or variables gathered during the autonomous pentest, via open source intelligence, or both. The autonomous pentesting agent may transform the environmental factors 330 into tokens such that the environmental factors 330 of various types and formats are in a same format that the training model 310 is capable of processing.

For example, the environmental factors may be tokenized in a similar manner to tokenizing the training passwords 315. That is, text (either plain text or leet text) representing an environmental factor of a network subject to an autonomous pentest may be parsed into strings of one or more characters (which may be referred to as tokens, chunks, or character strings). One or more of the tokens of the environmental factor (such as a beginning token) of the environmental factor text may be treated as a root or characteristic pattern of a password or password candidate, and may be input as a key to the training model 310.

As an example, the autonomous pentesting agent may discover that a domain name of a network associated with the training passwords 315 includes the text "Horizon3". This domain name text may be considered an environmental factor and characterized as an U1L6N1 word containing three tokens (that is, a one-character upper case character token, a six-character lower case character token, and a one-character numerical token). The autonomous pentesting agent may use a beginning or truncated portion of the characterization, such as U1L6, as a lookup key to other variations observed in the training passwords. For example, the training passwords may contain passwords such as "Horizon2024", "Horizon1!", among others, that begin with the U1L6 lookup key. A password candidate list 335 generated based on the training passwords 315 may include password candidates using a different U1L6 lookup key corresponding to an environmental factor specific to a network undergoing an autonomous pentest as a base word with statistically significant appendages observed from the training passwords 315. For example, a password candidate list 335 generated for a network associated with a domain including "Secured" may include password candidates such as "Secured2024", "Secured1!", and others.

After parsing the training passwords 315 into character tokens 320, the autonomous pentesting agent may determine probabilities 325 for the character tokens 320. For example, the autonomous pentesting agent may generalize the training passwords 315 into probabilities of character patterns appearing in statistically probable (e.g., likely) locations based on their lengths. That is, the autonomous pentesting agent may determine probabilities for each character token corresponding to each training password, where the probability represents a probability of occurrence of each character string of a respective character token at a given location within the character token. In other words, the probabilities 325 may be based on whether a character string (e.g., type and quantity of a character) is likely to be included in a password and, if so, where the character string is likely to be included in the password (e.g., at a beginning, middle, or end of the password; before or after another character string; in a given context, such as in a credential for an application or service; etc.).

In some examples, training passwords 315 may not follow common patterns or fit into classification parameters defined for the training model 310. In other words, the autonomous pentesting agent may fail to parse one or more elements of a training password into a character token (e.g., or into a character string of a character token, identify a tag, etc.). In such examples, the autonomous pentesting agent may generate or pull a generic shortlist of common weak password patterns and their mutations with common character patterns to use in the password spraying attack 340. The parsing of the training passwords 315 into character tokens 320 and assignment of probabilities may be described in greater detail elsewhere herein, including with reference to FIG. 4.

By parsing the training passwords 315 into character tokens 320, the autonomous pentesting agent may maintain anonymity of the training passwords 315. For example, the output of the training model 310 includes the character tokens 320 and corresponding probabilities 325, but is absent plain text of the training passwords 315. Accordingly, the autonomous pentesting agent may maintain secrecy of training passwords that originate from sources external to the network (e.g., other networks, the Dark Web, etc.). Additionally, by generating a password candidate list 335 based on patterns and associated probabilities, rather than common passwords, the autonomous pentesting agent may customize the password candidates to an environment in which they are used.

The training model 310, based on an input of autonomous pentest information 305, training passwords 315, and environmental factors 330, may output a password candidate list 335. That is, the autonomous pentesting agent may obtain, in association with the autonomous pentest, a password candidate list 335 (e.g., a custom sequence of password candidates) for the username(s) 355 (e.g., multiple user accounts) based on the character tokens 320 (e.g., one or more character pattern tokens) associated with the environmental factors 330 (e.g., one or more environmental factors) of the network, each character token associated with a set of one or more defined character strings having a defined statistical probability of inclusion in a password that includes the character pattern token, where the password candidate list 335 is ordered according to a total statistical probability of password compromise success. For example, the autonomous pentesting agent may determine or generate a password candidate list 335 based on the character tokens 320, the probabilities 325, and the environmental factors 330. The password candidate list 335 may include statistically probable (e.g., relevant) password candidates. The autonomous pentesting agent may use known patterns of passwords represented by the character tokens 320 to create a list of password candidates. For example, the autonomous pentesting agent may generate password candidates having same character strings and tags as respective character tokens. That is, the autonomous pentesting agent substitutes the character strings of a character token with characters that correspond to the character string and, in examples in which the character strings include tags, substitute the character strings with text that matches the tag. As an example, for a common root word tag that indicates a season having four lowercase letters, the autonomous pentesting agent may substitute "fall."

The autonomous pentesting agent may sort the generated password candidates into a password candidate list 335 where the password candidates are ordered from a highest probability to a lowest probability. In some examples, the autonomous pentesting agent may narrow a list of password candidates. That is, the autonomous pentesting agent may generate password candidates for character tokens that satisfy (e.g., meet or exceed) a threshold probability, or the autonomous pentesting agent may narrow the password candidate list 335 after password candidate generation and sorting. As an example, the autonomous pentesting agent may cut off the password candidate list 335 after a threshold quantity of password candidates (e.g., 100 password candidates) or after the probability drops below the threshold probability.

The autonomous pentesting agent may apply the password candidate list 335 in combination with the username(s) 355 in the password spraying attack 340. As used herein, to "apply" a password candidate list 335 or password candidates may refer to attempting to log in to an application, service, or other network asset by entering respective password candidates into a password field in combination with respective usernames of the username(s) 355 in a username field. That is, the autonomous pentesting agent may perform, during the autonomous pentest, a password spraying attack 340 (e.g., password spraying operation) associated with unauthorized access to one or more user accounts of multiple user accounts, where the password spraying attack 340 includes one or more successive attempts to compromise the password of one or more user accounts in accordance with the password candidate list 335. In some examples, the autonomous pentesting agent may prioritize most successful token patterns and lengths when generating the password candidate list 335. For example, the autonomous pentesting agent may apply the password candidate list 335 (e.g., in an order from most statistically probable to least statistically probable) at a first username of the username(s) 355, at a second username of the username(s) 355, and so on until a username and password combination is successfully identified. That is, the autonomous pentesting agent may apply the same password candidates in the same order to each of the usernames of the username(s) 355.

Alternatively, the autonomous pentesting agent may use customized password candidates for different usernames. For example, the autonomous pentesting agent may generate different password candidate lists for different usernames, such as based on an environment of the different usernames. As an example, the autonomous pentesting agent may use different environmental factors to determine different password candidates for a user that is identified to be in a first region (e.g., based on information obtained during an autonomous pentest, open source intelligence, etc.) than a different user that is identified to be in a second region.

The autonomous pentesting agent may use the username and password combination to gain unauthorized access to network assets accessible by a user account having the username and password combination. Gaining access to the network assets may be part of an autonomous pentest in which the autonomous pentesting agent gains access to other network access and compromises various aspects of the network.

The autonomous pentesting agent may use results of the password spraying attack 340 to train the training model 310. For example, the autonomous pentesting agent may train the training model 310 based on past pentesting operations and bias the model towards successfully applied password shapes or patterns. That is, the autonomous pentesting agent may determine that a character token associated with a password candidate that was successfully used in a previous pentest has a higher probability relative to a character token that has not yet been successfully used to gain unauthorized access to a user account. In other words, the autonomous pentesting agent may iteratively update the training model 310 based on passwords discovered through pentesting operations such that the training model 310 reflects and biases towards more recent data, which may be more relevant.

The autonomous pentesting agent may train the training model 310 with data from network environments, including environments associated with different types of user directories (e.g., Windows Active Directory environments). In some examples, the data may be used for other pentesting operations. For example, the autonomous pentesting agent may identify passwords that are successfully used during password spraying attacks and use the identified passwords to determine password patterns across multiple recent data points (e.g., relative to common lists of passwords, leaked passwords, etc.).

Figure 4:
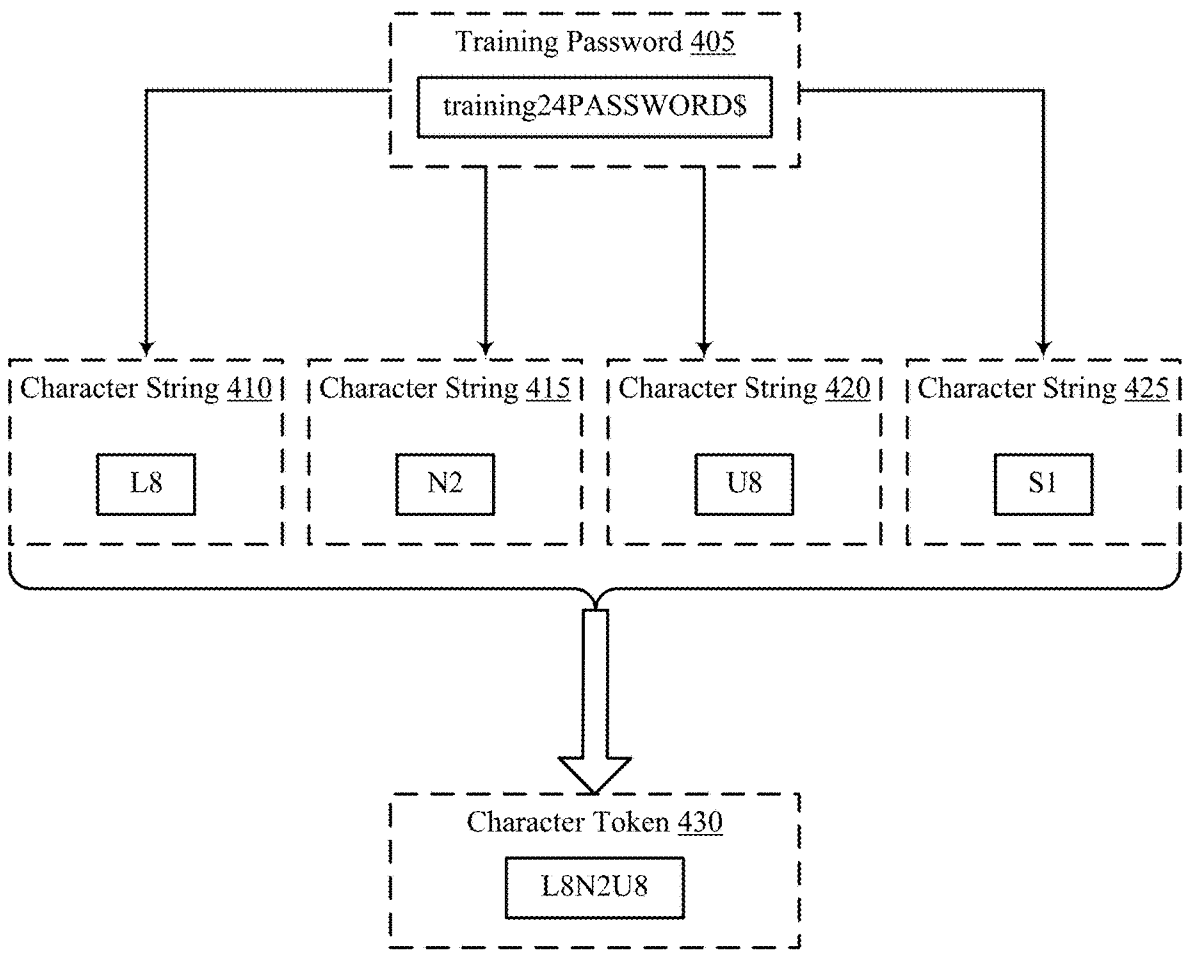
FIG. 4 shows an example of character token generation that supports autonomous password spraying during autonomous pentesting in accordance with aspects of the present disclosure.

FIG. 4 shows an example of character token generation 400 that supports autonomous password spraying during autonomous pentesting in accordance with aspects of the present disclosure. The character token generation 400 may implement or be implemented by the computing environment 100, the autonomous pentest map 200, the password spraying attack flow 300, or any combination thereof. For example, the character token generation 400 may illustrate parsing of a training password into character strings that make up a character token, which may be an example of the transformation of the training passwords 315 into character tokens 320 as described with reference to FIG. 3. Additionally, the character token generation 400 may be performed by an autonomous pentesting agent, such as the autonomous pentesting agent 105 described with reference to FIG. 1.

An autonomous pentesting agent may transform a training password 405 into a character token 430 having respective character strings. For example, the autonomous pentesting agent may parse the training password 405 "training24PASSWORD" into a character string 410 "L8" (e.g., corresponding to "training"), a character string 415 "N2" (e.g., corresponding to "24"), a character string 420 "U8" (e.g., corresponding to "PASSWORD"), and a character string 425 "S1" (e.g., corresponding to "$"). The character token 430 "L8N2U8" may include each of the character strings (e.g., as a combination).

The autonomous pentesting agent may determine priorities associated with different combinations of character strings. For example, the autonomous pentesting agent may determine, based on an environment where a password is to be used (e.g., based on environmental factors of a network), probabilities of character strings being at locations within a password (e.g., relative to other character strings). As an example, the below list of probabilities identifies a partial list of common character positions and patterns for an environment named "horizon 3."

```
'L3': {": 0.0014996591683708249,
   '1056': 0.00027266530334014993,
   '2006': 0.00027266530334014993,
   '2012': 0.0006816632583503748,
   '2014': 0.00027266530334014993,
   '2020!': 0.0005453306066803},
'L3U1L2': { },
'L3U1L4': { },
'L4': {": 0.0021813224267212,
   '056': 0.0004089979550102249,
   '12': 0.0009543285616905249,
   '123': 0.0004089979550102249,
   '2012': 0.0006816632583503749,
   '2013': 0.00040899795501022495,
   '2014': 0.00027266530334014993,
   '2015': 0.00027266530334014993,
   '340': 0.0008179959100204498},
'L4U1L1': { },
'L4U1L8': { },
'L4U4': { },
'L5': {": 0.0017723244717109748,
   '01': 0.00027266530334015,
   '1': 0.0008179959100204499,
   '456': 0.00027266530334015},
'U1L8': {'!': 0.0006816632583503749,
   '#1': 0.0008179959100204 5,
   '02': 0.00027266530334015,
   '04': 0.00027266530334015,
   '05!': 0.000408997955010225,
   '93': 0.00027266530334015,
   '99': 0.00027266530334015,
   '<YEAR>': 0.0013633265167007499,
   '<YEAR>!': 0.0005453306066803,
   '<YEAR_SHORT>': 0.0017723244717109748,
'<YEAR_SHORT>!': 0.000408997955010225,
'@021': 0.00027266530334015,
'@1': 0.00027266530334015,
'@1234': 0.00027266530334015}, . . .
```

In the above example, combinations of characters may have respective probabilities of occurring after one or more character strings occurring in a defined order. For example, a character string L3 may be followed by no other characters (e.g., ' ') with a probability of 0.0014996591683708249, 1056 with a probability of 0.0014996591683708249, and so on. Additionally, character types or placeholder words or numbers may have probabilities of occurring after one or more character strings. For example, a character string U1L8 may be followed by a year (e.g., a current year, a previous year, or a future year, such as current year +/−1) with a probability of 0.0013633265167007499, a shortened year (e.g., two digit year, such as 25 for 2025) with a probability of 0.0017723244717109748, and so on.

The autonomous pentesting agent may generate password candidates based on character tokens and probabilities, including the exemplary character token and probabilities described with reference to FIG. 4. For example, the autonomous pentesting agent may use most statistically probable combinations of character strings to determine an order and quantity (e.g., length) of different character strings for each password candidate. The autonomous pentesting agent may replace the character strings of respective character tokens with letters, numbers, and special characters that are most statistically probable (e.g., in accordance with a list of probabilities such as the example above). In some examples, the autonomous pentesting agent may use the one or more environmental factors to generate the candidate passwords. For example, the autonomous pentesting agent may replace the character strings of the respective character tokens with environmentally-relevant words, phrases, numbers, and special characters, such as names of regional sports teams, domain names, products of an enterprise associated with the domain, or the like.

As an example, beginnings of character tokens (e.g., one or more first character strings, such as excluding a last character string) may be used to loop up probable ending patterns that may be appended to the beginnings. For a domain name "Horizon3," a beginning of the domain name ("Horizon") may be tokenized as a U1L6 character token, and used as a root or beginning of various generated candidate password candidates. Specifically, the following probabilities of appended character strings may apply to the U1L6 character token:

```
U1L6: {
  "<YEAR>!": 0.3,
  "123!": 0.2,
  "1!": 0.5
}
```

In the above example, the autonomous pentesting agent may determine candidate passwords Horizon1!, Horizon2024!, and Horizon123! based on the associated probabilities of each ending character string that is appended to the beginning of the character token U1L6 and the identified domain name. In this example, the password candidate "Horizon1!" may be considered to be more statistically probable than "Horizon2024!", which may be considered more statistically probable than password candidate "Horizon123!". All of these password candidates, however, may be considered more statistically probable than a randomly generated password that does not account for the environmental factor of the domain name of the network.

Figure 5:
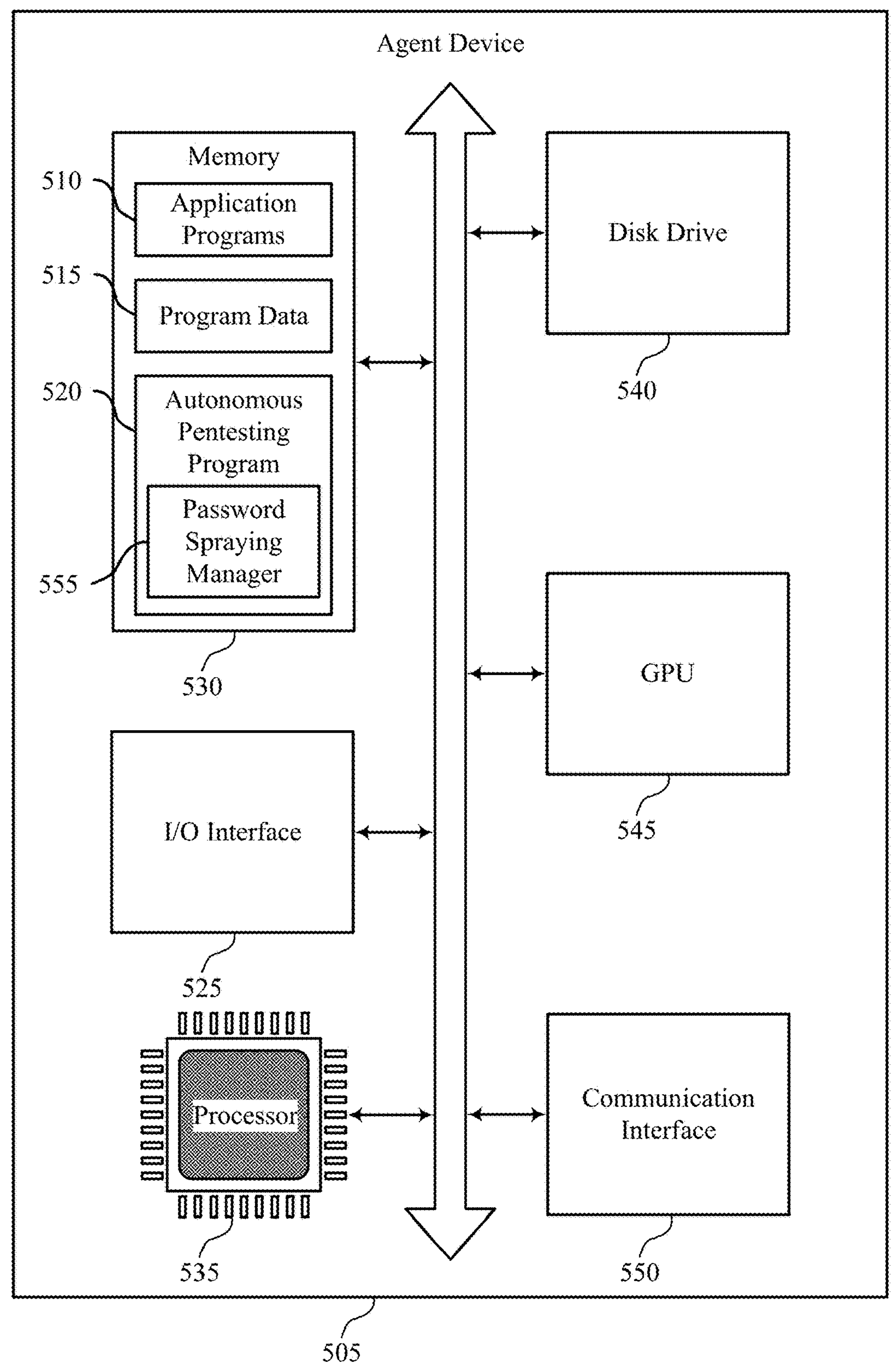
FIG. 5 shows a diagram of a system including a device that supports autonomous password spraying during autonomous pentesting in accordance with aspects of the present disclosure.

FIG. 5 shows a diagram of a system 500 including an agent device 505 that supports autonomous password spraying during autonomous pentesting in accordance with aspects of the present disclosure. The agent device 505 may be an example of a device or server on which an autonomous pentesting agent 105 is deployed as described herein. The agent device 505 may include components for autonomous password spraying during autonomous pentesting, such as a memory 530 including application programs 510, program data 515, an autonomous pentesting program 520, and a password spraying manager 555; an input/output (I/O) interface 525; a processor 535; a disk drive 540; a graphics processing unit (GPU) 545; and a communication interface 550. Each of these components may communicate, directly or indirectly, with one another (e.g., via one or more buses, communications links, communications interfaces, or any combination thereof).

The I/O interface 525 may support connection of the agent device 505 with one or more other devices. For example, the agent device 505 may connect to keyboards, mice, printers, hard disks, or the like via the I/O interface 525. The I/O interface 525 may communicate with the processor 535. That is, the processor 535 may process signals from devices connected to the agent device 505 via the I/O interface 525.

Memory 530 may include RAM, ROM, or both. The memory 530 may store computer-readable, computer-executable software including instructions that, when executed, cause at least one processor 535 to perform various functions described herein, such as functions supporting autonomous password spraying during autonomous pentesting. In some cases, the memory 530 may contain, among other things, a basic input/output system (BIOS), which may control basic hardware or software operation such as the interaction with peripheral components or devices. The memory 530 may be an example of a single memory or multiple memories. For example, the agent device 505 may include one or more memories 530.

The application programs 510 in the memory 530 may be examples of app(s) 140 as described with reference to FIG. 1. For example, the application programs 510 may be installed on the memory 530 of the agent device 505, among other devices in a network. The application programs 510 may be examples of software applications or computer programs that are implemented to carry out one or more functions or tasks.

The program data 515 may be data related to the application programs 510. Program data 515 may be an example of or refer to running data of programs and applications installed on the memory 530 of the agent device 505. In some examples, the program data 515 may include various data, including code that allows the application programs 510 to perform the one or more functions or tasks.

The processor 535 may include an intelligent hardware device, (e.g., a general-purpose processor, a digital signal processor (DSP), a CPU, a microcontroller, an application-specific integrated circuit (ASIC), a field programmable gate array (FPGA), a programmable logic device, a discrete gate or transistor logic component, a discrete hardware component, or any combination thereof). The processor 535 may be configured to execute computer-readable instructions stored in at least one memory 530 to perform various functions (e.g., functions or tasks supporting autonomous password spraying during autonomous pentesting). Though a single processor 535 is depicted in the example of FIG. 5, it is to be understood that the system 500 may include any quantity of one or more of processors 535 and that a group of processors 535 may collectively perform one or more functions ascribed herein to a processor, such as the processor 535. The processor 535 may be an example of a single processor or multiple processors. For example, the agent device 505 may include one or more processors 535.

The disk drive 540 may be configured to store data that is generated, processed, stored, or otherwise used by the system 500. In some cases, the disk drive 540 may include one or more hard disk drives (HDDs), one or more solid-state drives (SSDs), or both. In some examples, the disk drive 540 may be an example of a single database, a distributed database, multiple distributed databases, a data store, a data lake, or an emergency backup database. In some examples, the disk drive 540 may be an example of one or more components described with reference to FIG. 1.

GPU 545 may be configured to store graphics-related data. The GPU 545 may store and manage data related to graphics and video processing. In some examples, the GPU 545 may be an example of or a component of a graphics card. The GPU 545 may use components of the memory 530, including the RAM, for temporary storage. For example, the GPU 545 may move data from the RAM of the memory 530 to the GPU 545 for graphics and video processing.

The communication interface 550 may enable the agent device 505 to exchange information (e.g., input information, output information, or both) with other systems or devices (not shown). For example, the communication interface 550 may enable the agent device 505 to connect to a network (e.g., a network 110 as described herein). The communication interface 550 may include one or more wireless network interfaces, one or more wired network interfaces, or any combination thereof.

The autonomous pentesting program 520 may be an example of a program of an autonomous pentesting service that is installed on the memory 530 of the agent device 505. The autonomous pentesting program 520 may execute an autonomous pentest of a network accessed by the agent device 505, such as accessed via the communication interface 550. That is, the autonomous pentesting program 520 may be configured to perform an autonomous pentest as described herein, including an autonomous pentest involving autonomous password spraying.

The password spraying manager 555 may support autonomous password spraying in accordance with examples as disclosed herein. For example, the password spraying manager 555 may be configured as or otherwise support a means for executing an autonomous pentest of a network associated with multiple user accounts and multiple network assets, where each user account of the multiple user accounts has access to one or more respective network assets of the multiple network assets. The password spraying manager 555 may be configured as or otherwise support a means for obtaining, in association with the autonomous pentest, a custom sequence of password candidates for the multiple user accounts based on one or more character pattern tokens associated with one or more environmental factors of the network, each character pattern token associated with a set of one or more defined character strings having a defined statistical probability of inclusion in a password that includes the character pattern token, where the custom sequence of password candidates is ordered according to a total statistical probability of password compromise success. The password spraying manager 555 may be configured as or otherwise support a means for performing, during the autonomous pentest, a password spraying operation associated with unauthorized access to one or more user accounts of the multiple user accounts, where the password spraying operation includes one or more successive attempts to compromise the password of the one or more user accounts in accordance with the custom sequence of password candidates.

By including or configuring the password spraying manager 555 in accordance with examples as described herein, the agent device 505 may support techniques for improved network security.

Figure 6:
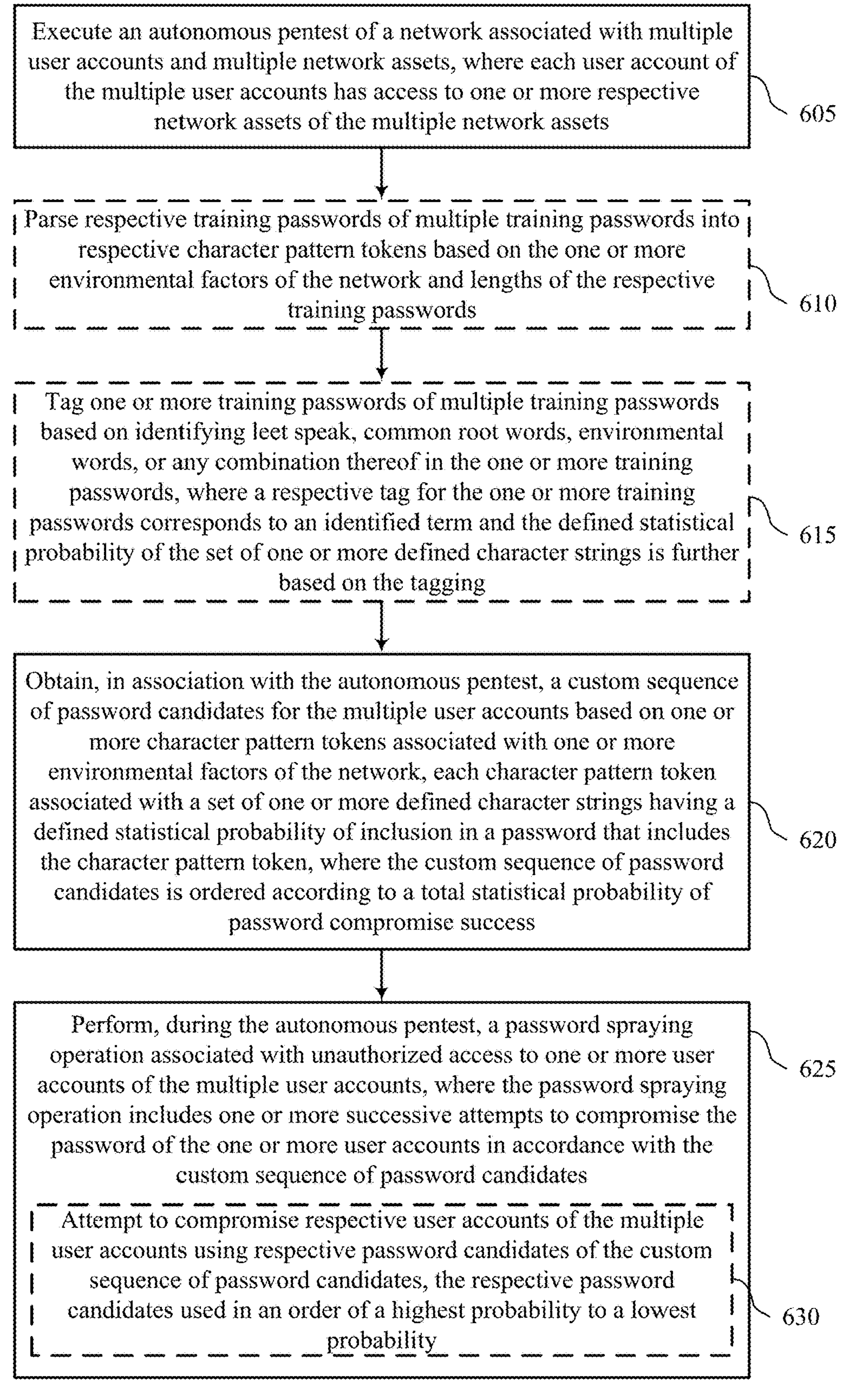
FIG. 6 shows a flowchart illustrating methods that support autonomous password spraying during autonomous pentesting in accordance with aspects of the present disclosure.

FIG. 6 shows a flowchart illustrating a method 600 that supports autonomous password spraying during autonomous pentesting in accordance with aspects of the present disclosure. The operations of the method 600 may be implemented by an agent device 505 or its components as described herein. In some examples, an agent device may execute a set of instructions to control the functional elements of the agent device to perform the described functions. Additionally, or alternatively, the agent device may perform aspects of the described functions using special-purpose hardware.

At 605, the method may include executing an autonomous pentest of a network associated with multiple user accounts and multiple network assets, where each user account of the multiple user accounts has access to one or more respective network assets of the multiple network assets.

At 610, the method may include parsing respective training passwords of multiple training passwords into respective character pattern tokens based on the one or more environmental factors of the network and lengths of the respective training passwords.

At 615, the method may include tagging one or more training passwords of multiple training passwords based on identifying leet speak, common root words, environmental words, or any combination thereof in the one or more training passwords, wherein a respective tag for the one or more training passwords corresponds to an identified term and the defined statistical probability of the set of one or more defined character strings is further based on the tagging.

At 620, the method may include obtaining, in association with the autonomous pentest, a custom sequence of password candidates for the multiple user accounts based on one or more character pattern tokens associated with one or more environmental factors of the network, each character pattern token associated with a set of one or more defined character strings having a defined statistical probability of inclusion in a password that includes the character pattern token, where the custom sequence of password candidates is ordered according to a total statistical probability of password compromise success.

At 625, the method may include performing, during the autonomous pentest, a password spraying operation associated with unauthorized access to one or more user accounts of the multiple user accounts, where the password spraying operation includes one or more successive attempts to compromise the password of the one or more user accounts in accordance with the custom sequence of password candidates.

In some examples, to perform the password spraying operation, at 630, the method may include attempting to compromise respective user accounts of the multiple user accounts using respective password candidates of the custom sequence of password candidates, the respective password candidates used in an order of a highest probability to a lowest probability.

It should be noted that these methods describe examples of implementations, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein.

The following provides an overview of aspects of the present disclosure:

Aspect 1: A method for autonomous password spraying, comprising: executing an autonomous pentest of a network associated with a plurality of user accounts and a plurality of network assets, wherein each user account of the plurality of user accounts has access to one or more respective network assets of the plurality of network assets; obtaining, in association with the autonomous pentest, a custom sequence of password candidates for the plurality of user accounts based at least in part on one or more character pattern tokens associated with one or more environmental factors of the network, each character pattern token associated with a set of one or more defined character strings having a defined statistical probability of inclusion in a password that includes the character pattern token, wherein the custom sequence of password candidates is ordered according to a total statistical probability of password compromise success; and performing, during the autonomous pentest, a password spraying operation associated with unauthorized access to one or more user accounts of the plurality of user accounts, wherein the password spraying operation includes one or more successive attempts to compromise the password of the one or more user accounts in accordance with the custom sequence of password candidates.

Aspect 2: The method of aspect 1, further comprising: parsing respective training passwords of a plurality of training passwords into respective character pattern tokens based at least in part on the one or more environmental factors of the network and lengths of the respective training passwords.

Aspect 3: The method of aspect 2, wherein the one or more defined character strings associated with each character pattern token include one or more of: a lowercase character string, an uppercase character string, a number character string, a special character string, or any combination thereof, and wherein each of the one or more defined character strings is associated with a defined length.

Aspect 4: The method of any of aspects 2 through 3, wherein the custom sequence of password candidates includes a plurality of password candidates, each password candidate of the plurality of password candidates having a respective combination of character types and lengths that corresponds to the respective combination of the one or more character pattern tokens.

Aspect 5: The method of any of aspects 2 through 4, wherein the respective character pattern tokens anonymize the plurality of training passwords such that plain text of the plurality of training passwords is omitted from the one or more character pattern tokens.

Aspect 6: The method of any of aspects 1 through 5, further comprising: tagging one or more training passwords of a plurality of training passwords based at least in part on identifying leet speak, common root words, environmental words, or any combination thereof in the one or more training passwords, wherein a respective tag for the one or more training passwords corresponds to an identified term and the defined statistical probability of the set of one or more defined character strings is further based at least in part on the tagging.

Aspect 7: The method of any of aspects 1 through 6, wherein the custom sequence of password candidates is based at least in part on a plurality of training passwords obtained via one or more autonomous pentests executed prior to the autonomous pentest, via a publicly available list of compromised passwords, via one or more user inputs prior to executing the autonomous pentest, or any combination thereof.

Aspect 8: The method of aspect 7, wherein one or more passwords obtained via the one or more autonomous pentests of a different network are anonymized.

Aspect 9: The method of any of aspects 7 through 8, wherein one or more passwords obtained via the one or more user inputs comprise expired passwords of the one or more user accounts of the plurality of user accounts.

Aspect 10: The method of any of aspects 1 through 9, wherein performing the password spraying operation comprises: attempting to compromise respective user accounts of the plurality of user accounts using respective password candidates of the custom sequence of password candidates, the respective password candidates used in an order of a highest probability to a lowest probability.

Aspect 11: The method of any of aspects 1 through 10, wherein the total statistical probability of the password compromise success comprises one or more defined statistical probabilities of the set of one or more defined character strings of each of the one or more character pattern tokens, the set of one or more defined character strings each corresponding to a respective password candidate of the custom sequence of password candidates.

Aspect 12: The method of any of aspects 1 through 11, wherein the custom sequence of password candidates is updated in real-time during the autonomous pentest in accordance with the one or more environmental factors, the one or more environmental factors being identified during the autonomous pentest.

Aspect 13: The method of any of aspects 1 through 12, wherein the custom sequence of password candidates is based at least in part on open source intelligence including information about users of the network available externally to the autonomous pentest.

Aspect 14: The method of any of aspects 1 through 13, wherein the one or more environmental factors include a geographic location of one or more network assets of the plurality of network assets.

Aspect 15: An apparatus for autonomous password spraying, comprising one or more memories storing processor-executable code, and one or more processors coupled with the one or more memories and individually or collectively operable to execute the code to cause the apparatus to perform a method of any of aspects 1 through 14.

Aspect 16: An apparatus for autonomous password spraying, comprising at least one means for performing a method of any of aspects 1 through 14.

Aspect 17: A non-transitory computer-readable medium storing code for autonomous password spraying, the code comprising instructions executable by one or more processors to perform a method of any of aspects 1 through 14.

It should be noted that these methods describe examples of implementations, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals described herein may be represented using any of a variety of different technologies and techniques. For example, data, instructions, commands, information, signals, bits, and symbols that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). The functions of each unit may also be implemented, in whole or in part, with instructions embodied in a memory, formatted to be executed by one or more general or application-specific processors.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components."

In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for autonomous password spraying, comprising:

executing an autonomous penetration test of a network associated with a plurality of user accounts and a plurality of network assets, wherein each user account of the plurality of user accounts has access to one or more respective network assets of the plurality of network assets;

obtaining, in association with the autonomous penetration test, a custom sequence of password candidates for the plurality of user accounts based at least in part on one or more character pattern tokens associated with one or more environmental factors of the network, each character pattern token associated with a set of one or more defined character strings having a defined statistical probability of inclusion in a password that includes the character pattern token, wherein the custom sequence of password candidates is ordered according to a total statistical probability of password compromise success; and performing, during the autonomous penetration test, a password spraying operation associated with unauthorized access to one or more user accounts of the plurality of user accounts, wherein the password spraying operation includes one or more successive attempts to compromise the password of the one or more user accounts in accordance with the custom sequence of password candidates.

2. The method of claim 1, further comprising:

parsing respective training passwords of a plurality of training passwords into respective character pattern tokens based at least in part on the one or more environmental factors of the network and lengths of the respective training passwords.

3. The method of claim 2, wherein the one or more defined character strings associated with each character pattern token include one or more of: a lowercase character string, an uppercase character string, a number character string, a special character string, or any combination thereof, and wherein each of the one or more defined character strings is associated with a defined length.

4. The method of claim 2, wherein the custom sequence of password candidates includes a plurality of password candidates, each password candidate of the plurality of password candidates having a respective combination of character types and lengths that corresponds to the respective combination of the one or more character pattern tokens.

5. The method of claim 2, wherein the respective character pattern tokens anonymize the plurality of training passwords such that plain text of the plurality of training passwords is omitted from the one or more character pattern tokens.

6. The method of claim 1, further comprising:

tagging one or more training passwords of a plurality of training passwords based at least in part on identifying leet speak, common root words, environmental words, or any combination thereof in the one or more training passwords, wherein a respective tag for the one or more training passwords corresponds to an identified term and the defined statistical probability of the set of one or more defined character strings is further based at least in part on the tagging.

7. The method of claim 1, wherein the custom sequence of password candidates is based at least in part on a plurality of training passwords obtained via one or more autonomous penetration tests executed prior to the autonomous penetration test, via a publicly available list of compromised passwords, via one or more user inputs prior to executing the autonomous penetration test, or any combination thereof.

8. The method of claim 7, wherein one or more passwords obtained via the one or more autonomous penetration tests of a different network are anonymized.

9. The method of claim 7, wherein one or more passwords obtained via the one or more user inputs comprise expired passwords of the one or more user accounts of the plurality of user accounts.

10. The method of claim 1, wherein performing the password spraying operation comprises:

attempting to compromise respective user accounts of the plurality of user accounts using respective password candidates of the custom sequence of password candidates, the respective password candidates used in an order of a highest probability to a lowest probability.

11. The method of claim 1, wherein the total statistical probability of the password compromise success comprises one or more defined statistical probabilities of the set of one or more defined character strings of each of the one or more character pattern tokens, the set of one or more defined character strings each corresponding to a respective password candidate of the custom sequence of password candidates.

12. The method of claim 1, wherein the custom sequence of password candidates is updated in real-time during the autonomous penetration test in accordance with the one or more environmental factors, the one or more environmental factors being identified during the autonomous penetration test.

13. The method of claim 1, wherein the custom sequence of password candidates is based at least in part on open source intelligence including information about users of the network available externally to the autonomous penetration test.

14. The method of claim 1, wherein the one or more environmental factors include a geographic location of one or more network assets of the plurality of network assets.

15. An apparatus for autonomous password spraying, comprising:

one or more memories storing processor-executable code; and one or more processors coupled with the one or more memories and individually or collectively operable to execute the code to cause the apparatus to:

execute an autonomous penetration test of a network associated with a plurality of user accounts and a plurality of network assets, wherein each user account of the plurality of user accounts has access to one or more respective network assets of the plurality of network assets;

obtain, in association with the autonomous penetration test, a custom sequence of password candidates for the plurality of user accounts based at least in part on one or more character pattern tokens associated with one or more environmental factors of the network, each character pattern token associated with a set of one or more defined character strings having a defined statistical probability of inclusion in a password that includes the character pattern token, wherein the custom sequence of password candidates is ordered according to a total statistical probability of password compromise success; and perform, during the autonomous penetration test, a password spraying operation associated with unauthorized access to one or more user accounts of the plurality of user accounts, wherein the password spraying operation includes one or more successive attempts to compromise the password of the one or more user accounts in accordance with the custom sequence of password candidates.

16. The apparatus of claim 15, wherein the one or more processors are individually or collectively further operable to execute the code to cause the apparatus to:

parse respective training passwords of a plurality of training passwords into respective character pattern tokens based at least in part on the one or more environmental factors of the network and lengths of the respective training passwords.

17. The apparatus of claim 16, wherein the one or more defined character strings associated with each character pattern token include a lowercase character string, an uppercase character string, a number character string, a special character string, or any combination thereof, and wherein each of the one or more defined character strings is associated with a defined length.

18. A non-transitory computer-readable medium storing code for autonomous password spraying, the code comprising instructions executable by one or more processors to:

execute an autonomous penetration test of a network associated with a plurality of user accounts and a plurality of network assets, wherein each user account of the plurality of user accounts has access to one or more respective network assets of the plurality of network assets;

obtain, in association with the autonomous penetration test, a custom sequence of password candidates for the plurality of user accounts based at least in part on one or more character pattern tokens associated with one or more environmental factors of the network, each character pattern token associated with a set of one or more defined character strings having a defined statistical probability of inclusion in a password that includes the character pattern token, wherein the custom sequence of password candidates is ordered according to a total statistical probability of password compromise success; and perform, during the autonomous penetration test, a password spraying operation associated with unauthorized access to one or more user accounts of the plurality of user accounts, wherein the password spraying operation includes one or more successive attempts to compromise the password of the one or more user accounts in accordance with the custom sequence of password candidates.

19. The non-transitory computer-readable medium of claim 18, wherein the instructions are further executable by the one or more processors to:

tag one or more training passwords of a plurality of training passwords based at least in part on identifying leet speak, common root words, environmental words, or any combination thereof in the one or more training passwords, wherein a respective tag for the one or more training passwords corresponds to an identified term and the defined statistical probability of the set of one or more defined character strings is further based at least in part on the tagging.

20. The non-transitory computer-readable medium of claim 18, wherein the custom sequence of password candidates is based at least in part on a plurality of training passwords obtained via one or more autonomous penetration tests executed prior to the autonomous penetration test, via a publicly available list of compromised passwords, via one or more user inputs prior to executing the autonomous penetration test, or any combination thereof.

* * * * *